W. H. THIEMER.
UNIVERSAL JOINT.
APPLICATION FILED MAY 17, 1919.

1,371,006.

Patented Mar. 8, 1921.

Inventor
William H. Thiemer,
By Hull, Smith, Buck & West
Attys.

UNITED STATES PATENT OFFICE.

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,371,006.  Specification of Letters Patent.  Patented Mar. 8, 1921.

Application filed May 17, 1919. Serial No. 297,753.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

Figure 1:
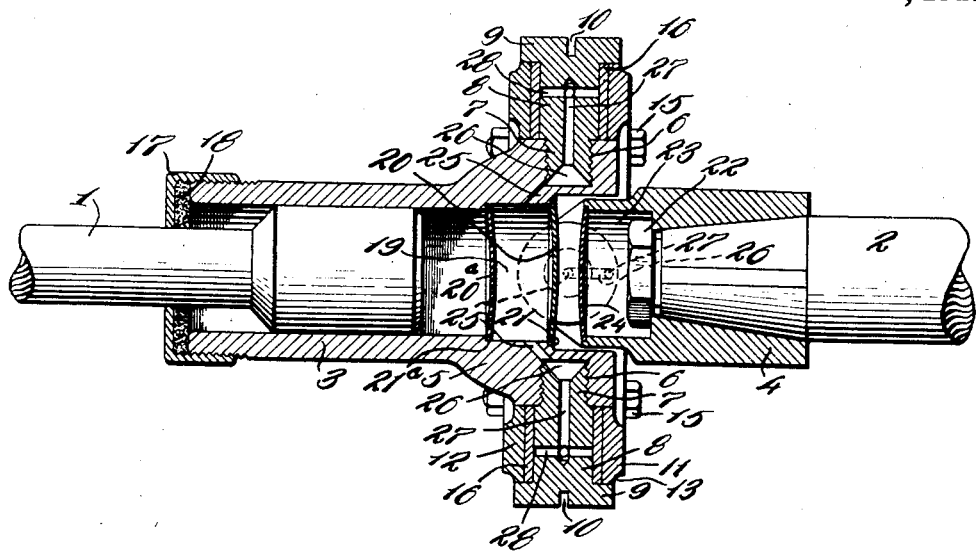
Figure 2:
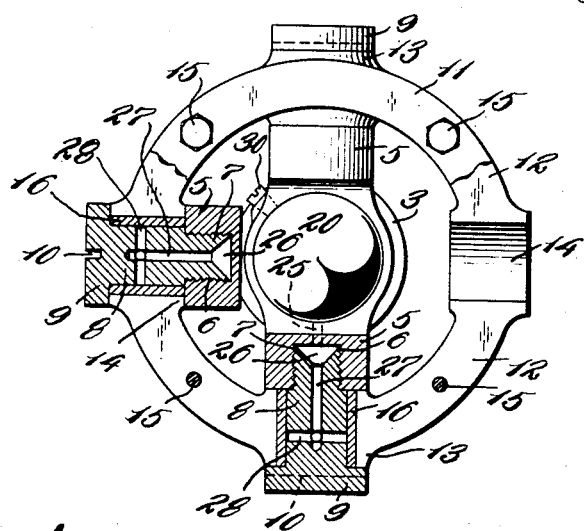

This invention relates to universal joints and more particularly to joints of the ring-and-yoke type. The object of the invention is to provide a joint of this character with means whereby the bearings for the trunnions may be effectively lubricated; also to provide a joint of this character which is simple of construction and convenient of assembling and disassembling. I secure these objects in and through the construction and arrangement of parts illustrated in the drawings forming part hereof, wherein Figure 1 represents a longitudinal sectional view through a pair of shaft sections connected by my joint, certain parts being shown in elevation; and Fig. 2 a view, partly in section and partly in elevation, of the connecting ring and the coöperating yokes, showing the manner of mounting the trunnions therein.

Describing the parts by reference characters, 1 and 2 denote the shaft sections, provided respectively with the hubs 3 and 4, each hub being forked, as shown at 5, and each of the forks or branches being provided with an internally threaded bore 6, extending inwardly from the outer surface thereof but preferably terminating short of the inner surface, said bore receiving therewithin the threaded stud 7 of a trunnion 8, the outer end of said trunnion being provided with a flanged head 9 provided with a slot 10 for the reception of a tool, such as a screw driver.

The shaft sections are connected, through their hubs and trunnions, by means of a ring, the said ring being preferably a two-part sectional ring, the sections or members of said ring being indicated respectively at 11 and 12. Each of these sections is provided with four half journals, indicated at 13 and 14, which journals, when the ring members or sections are united, as by means of bolts 15, receive therein the trunnions 8 and their bushings 16.

The shaft section 1 is shown as reciprocably mounted within a long hub 3, the outer end of said hub being closed about its shaft section by means of a gland nut 17 threaded onto the end of said hub, with a packing washer 18 interposed between the end of the hub and the flange on said nut. Between the end of the shaft section and the inner end of the hub there is provided a well 19 for lubricant, said well being closed by means of plates 20 and 20ᵃ which may be of the "Welch plug" type, sprung into seat 21 and 21ᵃ provided therefor in the hub.

The hub 4 is shown as a short hub connected to the tapered end of the shaft section 2 as by means of a nut 22. Within said hub and beyond said nut there is provided a well 23 for lubricant, which may also be closed by a plate 24 similar to the plate 20 and similarly secured in place.

From the well 19, inclined ports 25 extend outwardly to the bore 6, where they communicate each with a countersunk recess 26 formed within the inner end of a stud 7 the outer end of each recess 26 communicating with an axial port 27 in each trunnion 8, said axial port in turn communicating with a pair of transverse ports 28 extending to the interior of a bushing 16 surrounding each trunnion.

Similar ports, designated by like reference characters, extend from the well 23 to the trunnions and bushings carried by the hub 4. Each of the wells 20 and 23 may be supplied with lubricant from time to time by means of a suitable opening having a removable plug 30 therefor.

The yokes having the trunnions and bushings thereon may be conveniently connected by applying thereto the two sections 11 and 12 of the ring and setting up on the connecting bolts 15. In operation, lubricant from the wells 19 and 22 will be supplied by centrifugal action through the ports 25, 26, 27 and 28, to the bearings formed between the trunnions and their respective bushings.

Having thus described my invention, what I claim is:—

1. In a universal joint, the combination of a pair of shaft sections each having a hub, trunnions detachably connected to said hubs, a sectional ring, the sections whereof jointly provide bearings for said trunnions, a lubricant chamber provided within each hub, and ports for conducting lubricant by centrifugal action from each of said chambers to the bearings for its trunnions.

2. In a universal joint, the combination of a pair of shaft sections each having a hub, each hub being forked and each fork having a bore extending inwardly from the outer portion thereof, a trunnion mounted in each bore, each hub having a well for lubricant and ports extending from said well to its trunnions, a sectional ring, the sections whereof jointly provide bearings for said trunnions, and ports in said trunnions for conducting lubricant from the first mentioned ports to said bearings.

3. In a universal joint, the combination of a pair of shaft sections each having a hub provided with a pair of forks, each fork having a bore projecting inwardly from the outer portion thereof and a trunnion having a stud mounted in each bore, a sectional ring, the sections whereof jointly provide bearings for said trunnions, and bushings surrounding said trunnions within said bearings, each of said trunnions having a port and one or more ports extending therefrom to the interior of its bushing and each hub having a well for lubricant and ports or passageways extending therefrom to the ports of its trunnions.

4. In a universal joint, the combination of a pair of shaft sections each having a hub provided with a pair of forks, each fork having a bore projecting inwardly from the outer portion thereof and a trunnion having a stud mounted in each bore, and a ring having bearings for said trunnions, each of said trunnions, having an axial port and one or more ports extending therefrom to the interior of its bearing and each hub having a well for lubricant and ports or passageways extending therefrom to the axial ports of its trunnions.

5. In a universal joint, the combination of a pair of shaft sections, a hub for each shaft section having a pair of forks, each of said forks having a threaded bore projecting thereinto from the outer portion thereof, a trunnion having a threaded stud mounted in each bore and a head beyond the trunnion portion thereof, and a sectional ring having fractional bearings adapted to receive the trunnions and interposed between the heads and the studs thereof.

6. In a universal joint, the combination of a pair of shaft sections, a hub on each section provided with forks, each fork having a bore extending inwardly from the outer portion thereof, a ring surrounding said forks and having bearings therein, and trunnions mounted in said bearings and having studs mounted within said bores, each hub having a well for lubricant therein, and ports extending from each well for conducting lubricant therefrom to the bearings for its trunnions.

7. In a universal joint, the combination of a shaft section, a hub on such section provided with forks, each fork having a bore extending inwardly from the outer portion thereof, a ring surrounding said forks and having bearings therein, and trunnions mounted in said bearings and having studs mounted within said bores, there being a recess or chamber provided between the inner end of each stud and the inner end of its bore, said hub having a well for lubricant therein, and ports extending from said well to each recess or chamber and from each recess or chamber to the bearing for its trunnions.

8. In a universal joint, the combination of a pair of shaft sections, a hub for each shaft section having a pair of forks, each of said forks having a threaded bore projecting thereinto from the outer portion thereof, a trunnion having a stud mounted in each bore, each stud having a countersunk recess at its inner end and a passageway extending therefrom to the trunnion bearing, and a ring having fractional bearings adapted to receive the trunnions.

9. In a universal joint, the combination of a pair of shaft sections each having a hub provided with forks, a trunnion mounted in each of said forks, each hub having a well for lubricant, a sectional ring having bearings for said trunnions, and means for conducting lubricant by centrifugal action from each well to the bearings of the trunnions of its hub.

10. In a universal joint, the combination of a pair of shaft sections, a hub on each section provided with forks and with a well for lubricant, each fork having a bore extending inwardly from the outer portion thereof, a ring surrounding said forks and having bearings therein, trunnions mounted in said bearings and having studs mounted within said bores, and means for conducting lubricant by centrifugal action from each well to the bearings for the trunnions of its hub.

In testimony whereof, I hereunto affix my signature.

WILLIAM H. THIEMER.